US010960611B2

(12) United States Patent
Gunner

(10) Patent No.: US 10,960,611 B2
(45) Date of Patent: Mar. 30, 2021

(54) METHODS AND APPARATUSES FOR UNIVERSAL INTERFACE BETWEEN PARTS IN TRANSPORT STRUCTURES

(71) Applicant: DIVERGENT TECHNOLOGIES, INC., Los Angeles, CA (US)

(72) Inventor: Jon Paul Gunner, Palos Verdes Estates, CA (US)

(73) Assignee: DIVERGENT TECHNOLOGIES, INC., Los Angeles, CA (US)

(*) Notice: Subject to any disclaimer, the term of this patent is extended or adjusted under 35 U.S.C. 154(b) by 332 days.

(21) Appl. No.: 15/697,396

(22) Filed: Sep. 6, 2017

(65) Prior Publication Data
US 2019/0070791 A1 Mar. 7, 2019

(51) Int. Cl.
*B33Y 80/00* (2015.01)
*B29C 65/56* (2006.01)
*B29C 65/00* (2006.01)
*B29C 70/84* (2006.01)
*B29C 70/72* (2006.01)
*B29C 70/02* (2006.01)
B33Y 10/00 (2015.01)
B29C 70/34 (2006.01)
B29K 105/08 (2006.01)
B29L 31/30 (2006.01)
B29C 64/153 (2017.01)

(52) U.S. Cl.
CPC .......... *B29C 65/565* (2013.01); *B29C 66/47* (2013.01); *B29C 70/023* (2013.01); *B29C 70/72* (2013.01); *B29C 70/84* (2013.01); *B33Y 80/00* (2014.12); *B29C 64/153* (2017.08); *B29C 70/342* (2013.01); *B29K 2105/0872* (2013.01); *B29L 2031/30* (2013.01); *B33Y 10/00* (2014.12)

(58) Field of Classification Search
CPC .............. B33Y 80/00; Y10T 29/49826; Y10T 29/49595
See application file for complete search history.

(56) References Cited

U.S. PATENT DOCUMENTS 4,718,712 A * 1/1988 Nakatani .............. B62D 25/081
296/187.09
5,203,226 A 4/1993 Hongou et al.
(Continued)

FOREIGN PATENT DOCUMENTS

KR 1019980057773 A 9/1998
WO 1996036455 A1 11/1996
(Continued)

OTHER PUBLICATIONS

US 9,202,136 B2, 12/2015, Schmidt et al. (withdrawn)
(Continued)

*Primary Examiner* — Jason L Vaughan
*Assistant Examiner* — Amanda Kreiling
(74) *Attorney, Agent, or Firm* — Arent Fox LLP

(57) ABSTRACT

Techniques for providing universal interfaces between parts of a transport structure are disclosed. In one aspect of the disclosure, an apparatus for joining first and second parts of a transport structure includes an additively manufactured body having first and second surfaces. The first surface may connect to a first part such as, for example, a panel. The second surface may include a fitting for mating with a complementary fitting on a second part.

22 Claims, 13 Drawing Sheets

US 10,960,611 B2
Page 2

(56) References Cited

U.S. PATENT DOCUMENTS

| | | | |
|---|---|---|---|
| 5,443,673 A * | | 8/1995 | Fisher .................. B29C 43/18 156/245 |
| 5,742,385 A | | 4/1998 | Champa |
| 5,990,444 A | | 11/1999 | Costin |
| 6,010,155 A | | 1/2000 | Rinehart |
| 6,096,249 A | | 8/2000 | Yamaguchi |
| 6,140,602 A | | 10/2000 | Costin |
| 6,250,533 B1 | | 6/2001 | Otterbein et al. |
| 6,252,196 B1 | | 6/2001 | Costin et al. |
| 6,318,642 B1 | | 11/2001 | Goenka et al. |
| 6,365,057 B1 | | 4/2002 | Whitehurst et al. |
| 6,391,251 B1 | | 5/2002 | Keicher et al. |
| 6,409,930 B1 | | 6/2002 | Whitehurst et al. |
| 6,468,439 B1 | | 10/2002 | Whitehurst et al. |
| 6,554,345 B2 | | 4/2003 | Jonsson |
| 6,585,151 B1 | | 7/2003 | Ghosh |
| 6,644,721 B1 | | 11/2003 | Miskech et al. |
| 6,811,744 B2 | | 11/2004 | Keicher et al. |
| 6,866,497 B2 | | 3/2005 | Saiki |
| 6,919,035 B1 | | 7/2005 | Clough |
| 6,926,970 B2 | | 8/2005 | James et al. |
| 7,076,919 B2 * | | 7/2006 | Katakura .................. B60J 1/14 296/146.16 |
| 7,152,292 B2 | | 12/2006 | Hohmann et al. |
| 7,344,186 B1 | | 3/2008 | Hausler et al. |
| 7,500,373 B2 | | 3/2009 | Quell |
| 7,586,062 B2 | | 9/2009 | Heberer |
| 7,637,134 B2 | | 12/2009 | Burzlaff et al. |
| 7,710,347 B2 | | 5/2010 | Gentilman et al. |
| 7,716,802 B2 | | 5/2010 | Stern et al. |
| 7,745,293 B2 | | 6/2010 | Yamazaki et al. |
| 7,766,123 B2 | | 8/2010 | Sakurai et al. |
| 7,852,388 B2 | | 12/2010 | Shimizu et al. |
| 7,908,922 B2 | | 3/2011 | Zarabadi et al. |
| 7,951,324 B2 | | 5/2011 | Naruse et al. |
| 8,094,036 B2 | | 1/2012 | Heberer |
| 8,163,077 B2 | | 4/2012 | Eron et al. |
| 8,286,236 B2 | | 10/2012 | Jung et al. |
| 8,289,352 B2 | | 10/2012 | Vartanian et al. |
| 8,297,096 B2 | | 10/2012 | Mizumura et al. |
| 8,354,170 B1 | | 1/2013 | Henry et al. |
| 8,383,028 B2 | | 2/2013 | Lyons |
| 8,408,036 B2 | | 4/2013 | Reith et al. |
| 8,429,754 B2 | | 4/2013 | Jung et al. |
| 8,437,513 B1 | | 5/2013 | Derakhshani et al. |
| 8,444,903 B2 | | 5/2013 | Lyons et al. |
| 8,452,073 B2 | | 5/2013 | Taminger et al. |
| 8,599,301 B2 | | 12/2013 | Dowski, Jr. et al. |
| 8,606,540 B2 | | 12/2013 | Haisty et al. |
| 8,610,761 B2 | | 12/2013 | Haisty et al. |
| 8,631,996 B2 | | 1/2014 | Quell et al. |
| 8,675,925 B2 | | 3/2014 | Derakhshani et al. |
| 8,678,060 B2 | | 3/2014 | Dietz et al. |
| 8,686,314 B2 | | 4/2014 | Schneegans et al. |
| 8,686,997 B2 | | 4/2014 | Radet et al. |
| 8,694,284 B2 | | 4/2014 | Berard |
| 8,720,876 B2 | | 5/2014 | Reith et al. |
| 8,752,166 B2 | | 6/2014 | Jung et al. |
| 8,755,923 B2 | | 6/2014 | Farahani et al. |
| 8,787,628 B1 | | 7/2014 | Derakhshani et al. |
| 8,818,771 B2 | | 8/2014 | Gielis et al. |
| 8,873,238 B2 | | 10/2014 | Wilkins |
| 8,978,535 B2 | | 3/2015 | Ortiz et al. |
| 9,006,605 B2 | | 4/2015 | Schneegans et al. |
| 9,071,436 B2 | | 6/2015 | Jung et al. |
| 9,101,979 B2 | | 8/2015 | Hofmann et al. |
| 9,104,921 B2 | | 8/2015 | Derakhshani et al. |
| 9,126,365 B1 | | 9/2015 | Mark et al. |
| 9,128,476 B2 | | 9/2015 | Jung et al. |
| 9,138,924 B2 | | 9/2015 | Yen |
| 9,149,988 B2 | | 10/2015 | Mark et al. |
| 9,156,205 B2 | | 10/2015 | Mark et al. |
| 9,186,848 B2 | | 11/2015 | Mark et al. |
| 9,244,986 B2 | | 1/2016 | Karmarkar |
| 9,248,611 B2 | | 2/2016 | Divine et al. |
| 9,254,535 B2 | | 2/2016 | Buller et al. |
| 9,266,566 B2 | | 2/2016 | Kim |
| 9,269,022 B2 | | 2/2016 | Rhoads et al. |
| 9,327,452 B2 | | 5/2016 | Mark et al. |
| 9,329,020 B1 | | 5/2016 | Napoletano |
| 9,332,251 B2 | | 5/2016 | Haisty et al. |
| 9,346,127 B2 | | 5/2016 | Buller et al. |
| 9,389,315 B2 | | 7/2016 | Bruder et al. |
| 9,399,256 B2 | | 7/2016 | Buller et al. |
| 9,403,235 B2 | | 8/2016 | Buller et al. |
| 9,418,193 B2 | | 8/2016 | Dowski, Jr. et al. |
| 9,457,514 B2 | | 10/2016 | Schwärzler |
| 9,469,057 B2 | | 10/2016 | Johnson et al. |
| 9,478,063 B2 | | 10/2016 | Rhoads et al. |
| 9,481,402 B1 | | 11/2016 | Muto et al. |
| 9,486,878 B2 | | 11/2016 | Buller et al. |
| 9,486,960 B2 | | 11/2016 | Paschkewitz et al. |
| 9,502,993 B2 | | 11/2016 | Deng |
| 9,525,262 B2 | | 12/2016 | Stuart et al. |
| 9,533,526 B1 | | 1/2017 | Nevins |
| 9,555,315 B2 | | 1/2017 | Aders |
| 9,555,580 B1 | | 1/2017 | Dykstra et al. |
| 9,557,856 B2 | | 1/2017 | Send et al. |
| 9,566,742 B2 | | 2/2017 | Keating et al. |
| 9,566,758 B2 | | 2/2017 | Cheung et al. |
| 9,573,193 B2 | | 2/2017 | Buller et al. |
| 9,573,225 B2 | | 2/2017 | Buller et al. |
| 9,586,290 B2 | | 3/2017 | Buller et al. |
| 9,595,795 B2 | | 3/2017 | Lane et al. |
| 9,597,843 B2 | | 3/2017 | Stauffer et al. |
| 9,600,929 B1 | | 3/2017 | Young et al. |
| 9,609,755 B2 | | 3/2017 | Coull et al. |
| 9,610,737 B2 | | 4/2017 | Johnson et al. |
| 9,611,667 B2 | | 4/2017 | GangaRao et al. |
| 9,616,623 B2 | | 4/2017 | Johnson et al. |
| 9,626,487 B2 | | 4/2017 | Jung et al. |
| 9,626,489 B2 | | 4/2017 | Nilsson |
| 9,643,361 B2 | | 5/2017 | Liu |
| 9,662,840 B1 | | 5/2017 | Buller et al. |
| 9,665,182 B2 | | 5/2017 | Send et al. |
| 9,672,389 B1 | | 6/2017 | Mosterman et al. |
| 9,672,550 B2 | | 6/2017 | Apsley et al. |
| 9,676,145 B2 | | 6/2017 | Buller et al. |
| 9,684,919 B2 | | 6/2017 | Apsley et al. |
| 9,688,032 B2 | | 6/2017 | Kia et al. |
| 9,690,286 B2 | | 6/2017 | Hovsepian et al. |
| 9,700,966 B2 | | 7/2017 | Kraft et al. |
| 9,703,896 B2 | | 7/2017 | Zhang et al. |
| 9,713,903 B2 | | 7/2017 | Paschkewitz et al. |
| 9,718,302 B2 | | 8/2017 | Young et al. |
| 9,718,434 B2 | | 8/2017 | Hector, Jr. et al. |
| 9,724,877 B2 | | 8/2017 | Flitsch et al. |
| 9,724,881 B2 | | 8/2017 | Johnson et al. |
| 9,725,178 B2 | | 8/2017 | Wang |
| 9,731,730 B2 | | 8/2017 | Stiles |
| 9,731,773 B2 | | 8/2017 | Gami et al. |
| 9,741,954 B2 | | 8/2017 | Bruder et al. |
| 9,747,352 B2 | | 8/2017 | Karmarkar |
| 9,764,415 B2 | | 9/2017 | Seufzer et al. |
| 9,764,520 B2 | | 9/2017 | Johnson et al. |
| 9,765,226 B2 | | 9/2017 | Dain |
| 9,770,760 B2 | | 9/2017 | Liu |
| 9,773,393 B2 | | 9/2017 | Velez |
| 9,776,234 B2 | | 10/2017 | Schaafhausen et al. |
| 9,782,936 B2 | | 10/2017 | Glunz et al. |
| 9,783,324 B2 | | 10/2017 | Embler et al. |
| 9,783,977 B2 | | 10/2017 | Alqasimi et al. |
| 9,789,548 B2 | | 10/2017 | Golshany et al. |
| 9,789,922 B2 | | 10/2017 | Dosenbach et al. |
| 9,796,137 B2 | | 10/2017 | Zhang et al. |
| 9,802,108 B2 | | 10/2017 | Aders |
| 9,809,977 B2 | | 11/2017 | Carney et al. |
| 9,817,922 B2 | | 11/2017 | Glunz et al. |
| 9,818,071 B2 | | 11/2017 | Jung et al. |
| 9,821,339 B2 | | 11/2017 | Paschkewitz et al. |
| 9,821,411 B2 | | 11/2017 | Buller et al. |
| 9,823,143 B2 | | 11/2017 | Twelves, Jr. et al. |
| 9,829,564 B2 | | 11/2017 | Bruder et al. |
| 9,846,933 B2 | | 12/2017 | Yuksel |

(56) References Cited

U.S. PATENT DOCUMENTS

| | | |
|---|---|---|
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |

(56) References Cited

U.S. PATENT DOCUMENTS

| | | | |
|---|---|---|---|
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2006/0108783 A1 | 5/2006 | Ni et al. |
| 2009/0129885 A1* | 5/2009 | Csik ............... F16B 37/046 411/103 |
| 2011/0176863 A1* | 7/2011 | Hanley ............ B60R 13/0206 403/267 |
| 2014/0086704 A1* | 3/2014 | Hemingway ...... B29C 64/141 411/392 |
| 2014/0277669 A1 | 9/2014 | Nardi et al. |
| 2017/0057558 A1 | 3/2017 | Hillebrecht et al. |
| 2017/0113344 A1 | 4/2017 | Schönberg |
| 2017/0341309 A1 | 11/2017 | Piepenbrock et al. |

FOREIGN PATENT DOCUMENTS

| | | |
|---|---|---|
| WO | 1996036525 A1 | 11/1996 |
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
International Search Report and Written Opinion dated Nov. 26, 2018 regarding PCT/US2018/044947.

* cited by examiner

METHODS AND APPARATUSES FOR
UNIVERSAL INTERFACE BETWEEN PARTS
IN TRANSPORT STRUCTURES

BACKGROUND

Field

The present disclosure relates generally to parts used in transport structures, and more specifically to additively manufactured techniques for providing an interface between different parts.

Background

Transport structures conventionally use body panels or outer shells that are configured to bear structural loads. The panels in these configurations require brackets and other comparatively sophisticated mechanical attachments to interface with other components. The mechanical attachments are conventionally produced using traditional machining techniques, which have limited versatility in their ability to produce complex structures. Thus, such mechanical interfaces between components can be expensive, and their manufacture time-consuming.

Manufacturers have increasingly used additive manufacturing ("AM") as a means to produce more complex and cost-efficient components. AM systems, also described as three-dimensional (3-D) printers, can produce structures having geometrically complex shapes, including some shapes that are difficult or impossible to create using conventional manufacturing processes. While these AM capabilities have broad application, they are particularly widespread in industries involving vehicles, boats, aircraft, motorcycles, trucks, trains, busses, subways, and other transport structures.

The present disclosure addresses challenges associated with providing interfaces for different components in a transport structure.

SUMMARY

Several aspects of a universal parts interface will be described more fully hereinafter.

One aspect of an apparatus for joining parts of a transport structure includes an additively manufactured body configured to be co-molded with a first part and including a first surface for connecting to the first part, and a second surface comprising a fitting for mating with a complementary fitting disposed on a second part.

Another aspect of an apparatus includes an additively manufactured node for a transport structure, including a joint member configured to provide at least one structural connection, and an extended structure coupled to the joint member and comprising a fitting for connecting to a complementary fitting arranged on a part.

One aspect of a method for providing an interface between first and second parts of a transport structure includes additively manufacturing an interface structure having a first section coupled to a second section, the second section comprising a fitting, and co-molding the interface structure with the first part, wherein the first section is coupled to the first part.

It will be understood that other aspects of providing interfaces using AM components will become readily apparent to those skilled in the art from the following detailed description, wherein it is shown and described only several embodiments by way of illustration. As will be realized by those skilled in the art, the subject matter presented herein is capable of other and different embodiments and its several details are capable of modification in various other respects, all without departing from the invention. Accordingly, the drawings and detailed description are to be regarded as illustrative in nature and not as restrictive.

BRIEF DESCRIPTION OF THE DRAWINGS

Various aspects of interfaces between parts of a transport structure will now be presented in the detailed description by way of example, and not by way of limitation, in the accompanying drawings, wherein.

DETAILED DESCRIPTION

The detailed description set forth below in connection with the appended drawings is intended to provide a description of various exemplary embodiments of interfaces between parts of a transport structure and is not intended to represent the only embodiments in which the invention may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

The use of 3-D printing in the context of transport structures provides significant flexibility for enabling manufacturers of mechanical structures and mechanized assemblies to manufacture parts with complex geometries. For example, 3-D printing techniques provide manufacturers with the flexibility to design and build parts having intricate internal lattice structures and/or profiles that are not possible to manufacture via traditional manufacturing processes.

Figure 1:
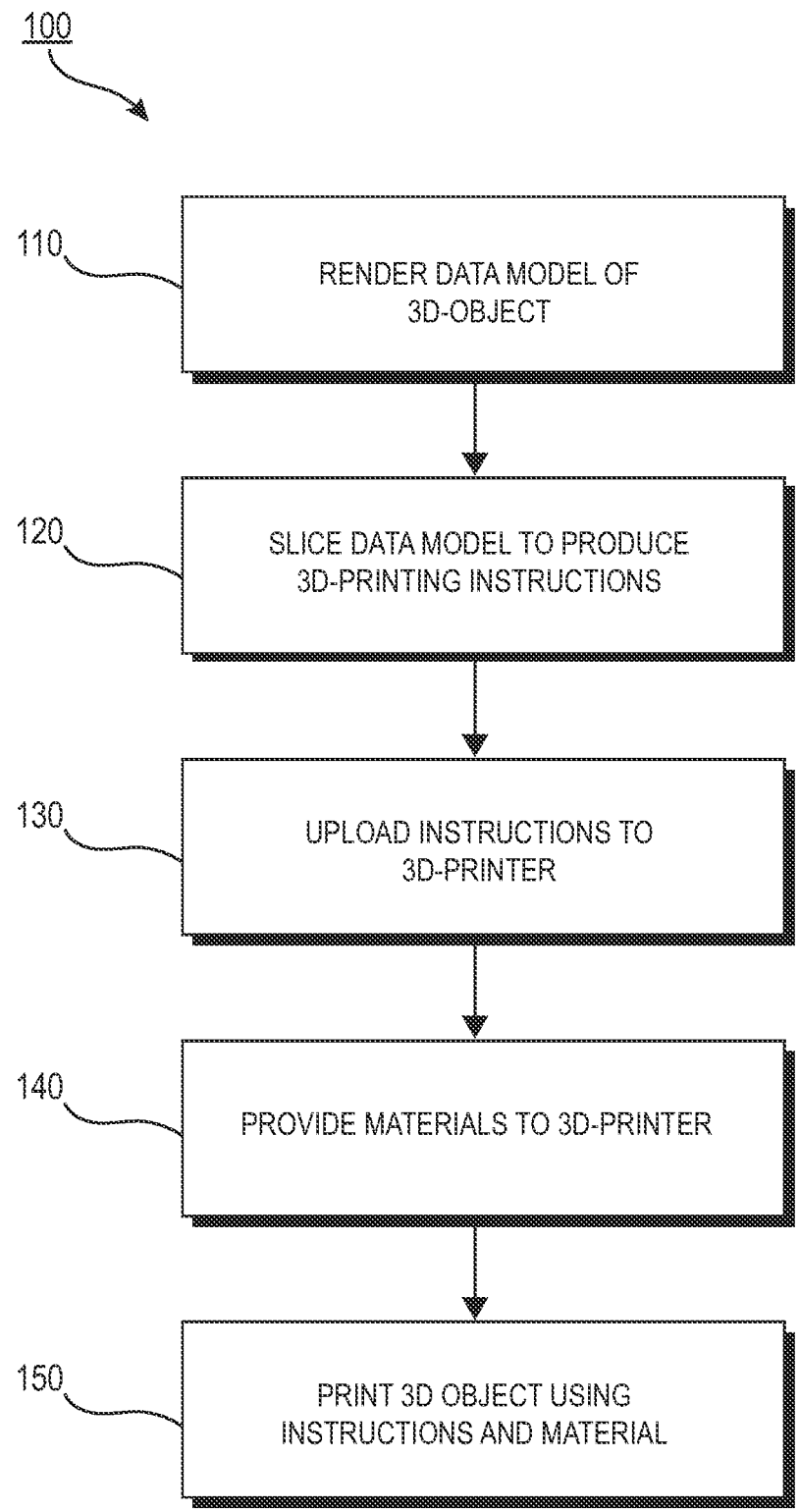
FIG. 1 is a flow diagram illustrating an exemplary process of initiating 3-D printing.

FIG. 1 is a flow diagram 100 illustrating an exemplary process of initiating an AM process. A data model of the desired 3-D object to be printed is rendered (step 110). A data model is a virtual design of the 3-D object. Thus, the data model may reflect the geometrical and structural features of the 3-D object, as well as its material composition. The data model may be created using a variety of methods, including CAE-based optimization, 3D modeling, photogrammetry software, and camera imaging. CAE-based optimization may include, for example, cloud-based optimization, fatigue analysis, linear or non-linear finite element analysis (FEA), and durability analysis.

3-D modeling software, in turn, may include one of numerous commercially available 3-D modeling software applications. Data models may be rendered using a suitable computer-aided design (CAD) package, for example in an STL format. STL is one example of a file format associated with commercially available CAD software. A CAD program may be used to create the data model of the 3-D object as an STL file. Thereupon, the STL file may undergo a process whereby errors in the file are identified and resolved.

Following error resolution, the data model can be "sliced" by a software application known as a slicer to thereby produce a set of instructions for 3-D printing the object, with the instructions being compatible and associated with the particular 3-D printing technology to be utilized (step 120). Numerous slicer programs are commercially available. Slicer programs convert the data model into a series of individual layers representing thin slices (e.g., 100 microns thick) of the object be printed, along with a file containing the printer-specific instructions for 3-D printing these successive individual layers to produce an actual 3-D printed representation of the data model.

A common type of file used for this purpose is a G-code file, which is a numerical control programming language that includes instructions for 3-D printing the object. The G-code file, or other file constituting the instructions, is uploaded to the 3-D printer (step 130). Because the file containing these instructions is typically configured to be operable with a specific 3-D printing process, it will be appreciated that many formats of the instruction file are possible depending on the 3-D printing technology used.

In addition to the printing instructions that dictate what and how an object is to be rendered, the appropriate physical materials necessary for use by the 3-D printer in rendering the object are loaded into the 3-D printer using any of several conventional and often printer-specific methods (step 140). Powder bed fusion (PBF), for example, is an AM technique that uses a laser or other power source, along with a deflector, to fuse powdered material by aiming the laser or power source automatically at points in space defined by a 3-D model and binding the material together to create a solid structure. PBF includes within its scope various specific types of AM methods. Selective laser melting (SLM) and selective laser sintering (SLS), for instance, are PBF techniques in which print materials may be loaded as powders into a powder bed defined by a build plate and bordering walls (see FIGS. 2A-D). Layers of powder are deposited in a controlled manner into the powder bed for the power source to selectively manipulate on a layer-by-layer basis. Depending on the type of 3-D printer, other techniques for loading printing materials may be used. For example, in fused deposition modelling (FDM) 3-D printers, materials are often loaded as filaments on spools, which are placed on one or more spool holders. The filaments are typically fed into an extruder apparatus which, in operation, heats the filament into a melted form before ejecting the material onto a build plate or other substrate.

Referring back to FIG. 1, the respective data slices of the 3-D object are then printed based on the provided instructions using the material(s) (step 150). In 3-D printers that use laser sintering, a laser scans a powder bed and melts the powder together where structure is desired, and avoids scanning areas where the sliced data indicates that nothing is to be printed. This process may be repeated thousands of times until the desired structure is formed, after which the printed part is removed from a fabricator. In fused deposition modelling, parts are printed by applying successive layers of model and support materials to a substrate. In general, any suitable 3-D printing technology may be employed for purposes of this disclosure.

FIGS. 2A-D illustrate respective side views of an exemplary PBF system 200 during different stages of operation. As noted above, the particular embodiment illustrated in FIGS. 2A-D is one of many suitable examples of a PBF system employing principles of this disclosure. It should also be noted that elements of FIGS. 2A-D and the other figures in this disclosure are not necessarily drawn to scale, but may be drawn larger or smaller for the purpose of better illustration of concepts described herein. PBF system 200 can include a depositor 201 that can deposit each layer of metal powder, an energy beam source 203 that can generate an energy beam, a deflector 205 that can apply the energy beam to fuse the powder, and a build plate 207 that can support one or more build pieces, such as a build piece 209. PBF system 200 can also include a build floor 211 positioned within a powder bed receptacle. The walls of the powder bed receptacle 212 generally define the boundaries of the powder bed receptacle, which is sandwiched between the walls 212 from the side and abuts a portion of the build floor 211 below. Build floor 211 can progressively lower build plate 207 so that depositor 201 can deposit a next layer. The entire mechanism may reside in a chamber 213 that can enclose the other components, thereby protecting the equipment, enabling atmospheric and temperature regulation and mitigating contamination risks. Depositor 201 can include a hopper 215 that contains a powder 217, such as a metal powder, and a leveler 219 that can level the top of each layer of deposited powder.

Figure 2A:
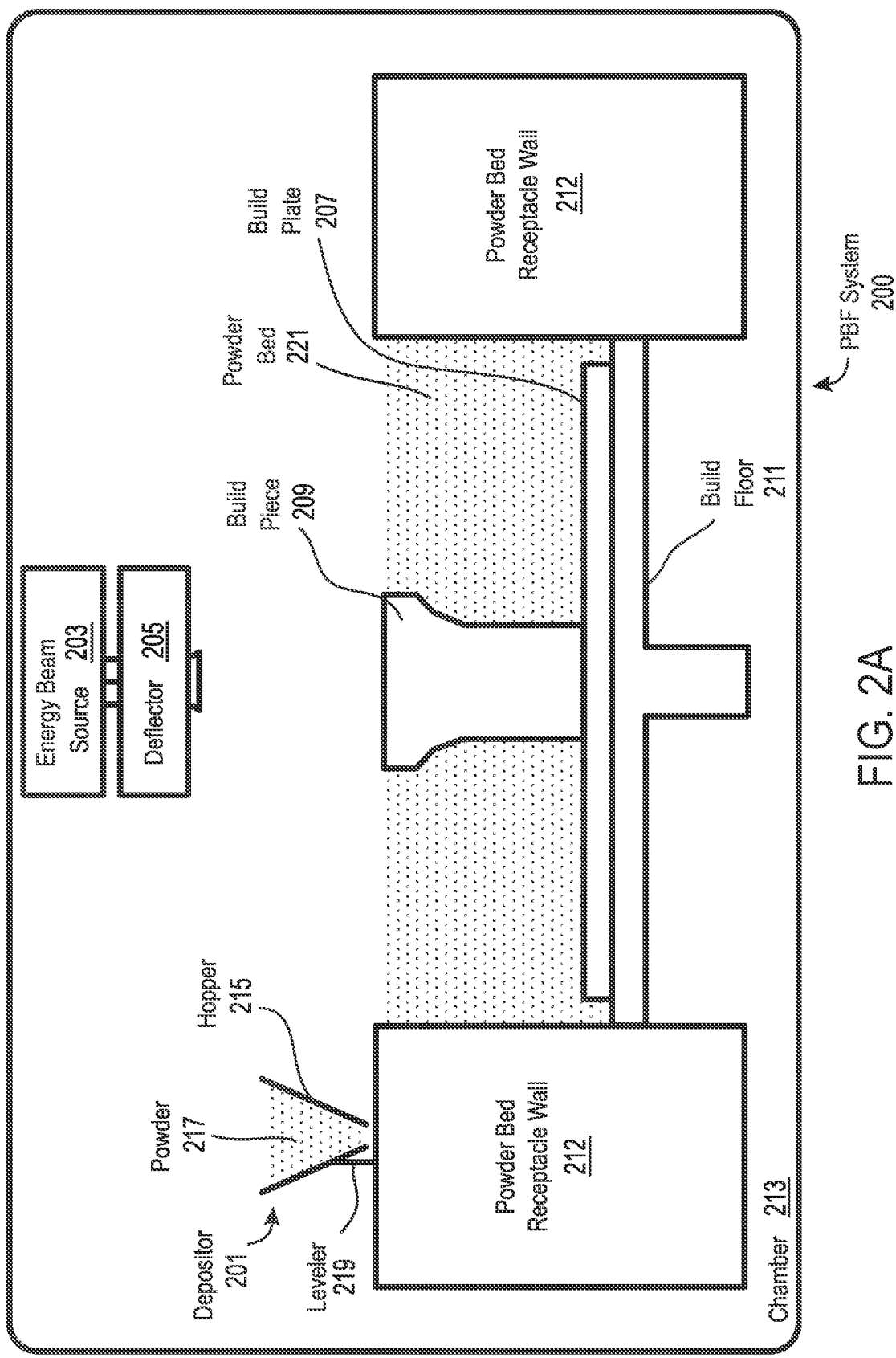
FIGS. 2A-D illustrate an exemplary powder bed fusion (PBF) system during different stages of operation.

Referring specifically to FIG. 2A, this figure shows PBF system 200 after a slice of build piece 209 has been fused, but before the next layer of powder has been deposited. In fact, FIG. 2A illustrates a time at which PBF system 200 has already deposited and fused slices in multiple layers, e.g., 150 layers, to form the current state of build piece 209, e.g., formed of 150 slices. The multiple layers already deposited have created a powder bed 221, which includes powder that was deposited but not fused.

Figure 2B:
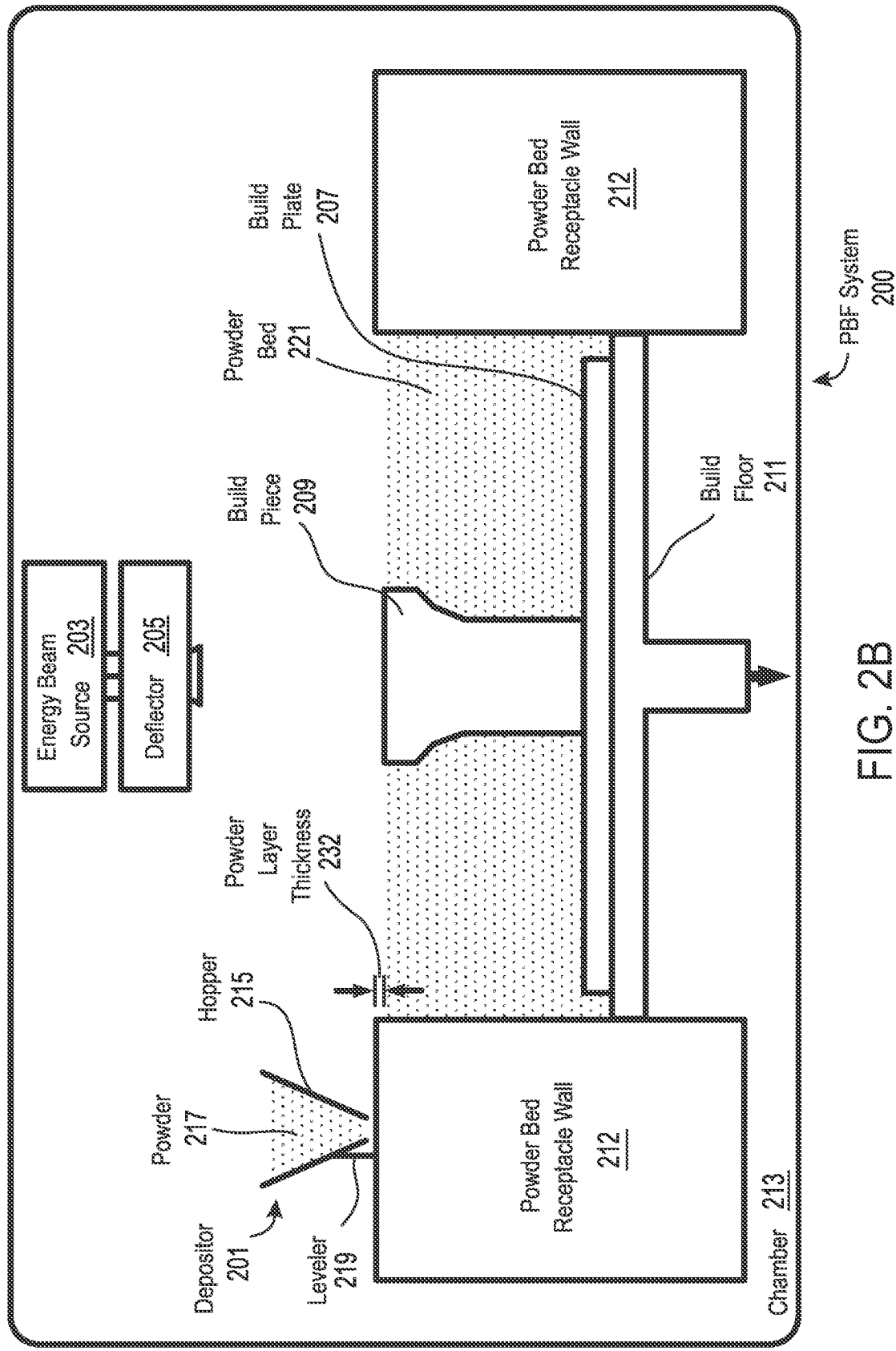

FIG. 2B shows PBF system 200 at a stage in which build floor 211 can lower by a powder layer thickness 232. The lowering of build floor 211 causes build piece 209 and powder bed 221 to drop by powder layer thickness 232, so that the top of the build piece and powder bed are lower than the top of powder bed receptacle wall 212 by an amount equal to the powder layer thickness. In this way, for example, a space with a consistent thickness equal to powder layer thickness 232 can be created over the tops of build piece 209 and powder bed 221.

Figure 2C:
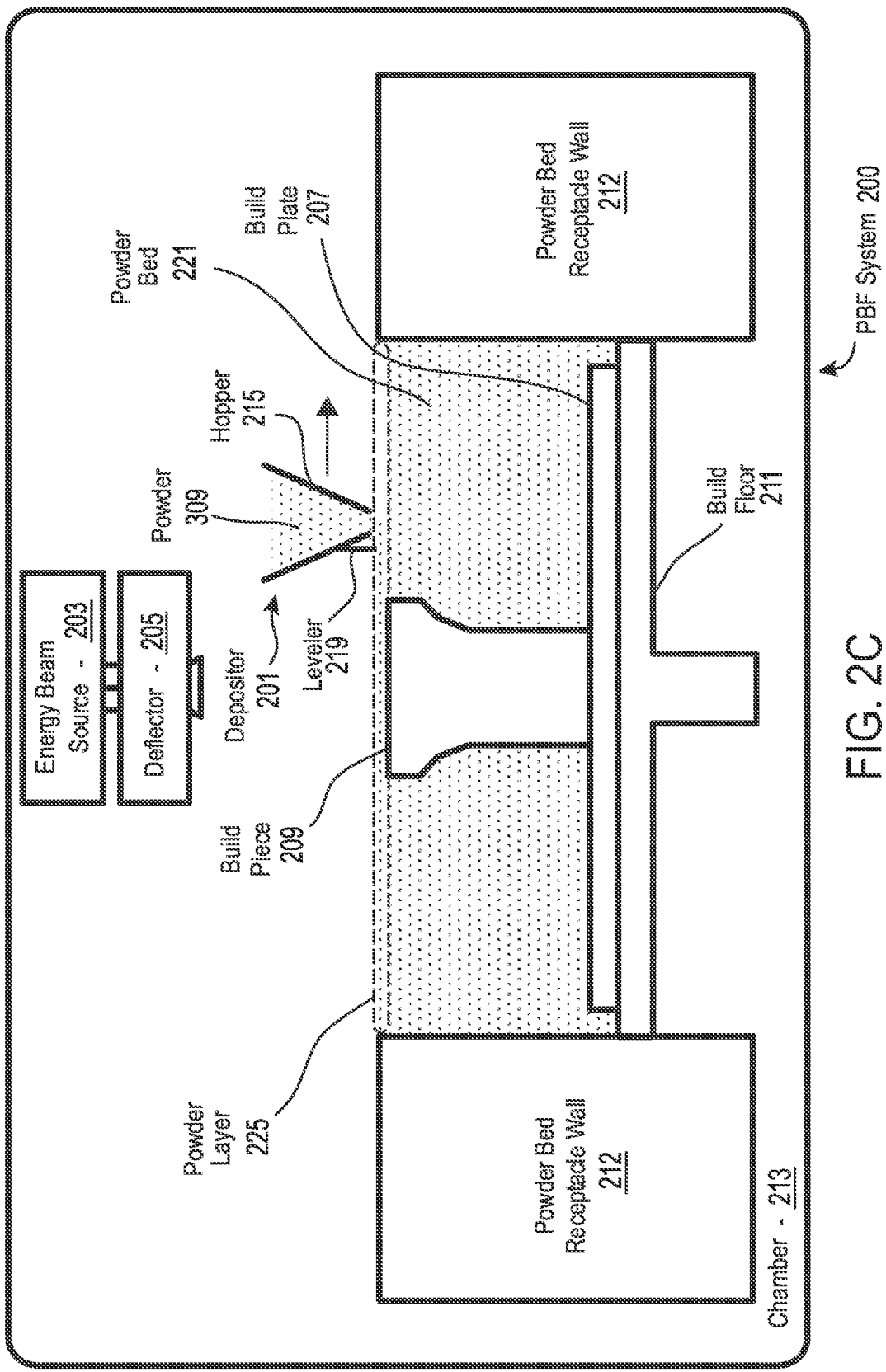

FIG. 2C shows PBF system 200 at a stage in which depositor 201 is positioned to deposit powder 217 in a space created over the top surfaces of build piece 209 and powder bed 221 and bounded by powder bed receptacle walls 212. In this example, depositor 201 progressively moves over the defined space while releasing powder 217 from hopper 215. Leveler 219 can level the released powder to form a powder layer 225 that has a thickness substantially equal to the powder layer thickness 232 (see FIG. 2B). Thus, the powder in a PBF system can be supported by a powder support structure, which can include, for example, a build plate 207, a build floor 211, a build piece 209, walls 212, and the like. It should be noted that the illustrated thickness of powder layer 225 (i.e., powder layer thickness 232 (FIG. 2B)) is greater than an actual thickness used for the example involving 150 previously-deposited layers discussed above with reference to FIG. 2A.

Figure 2D:
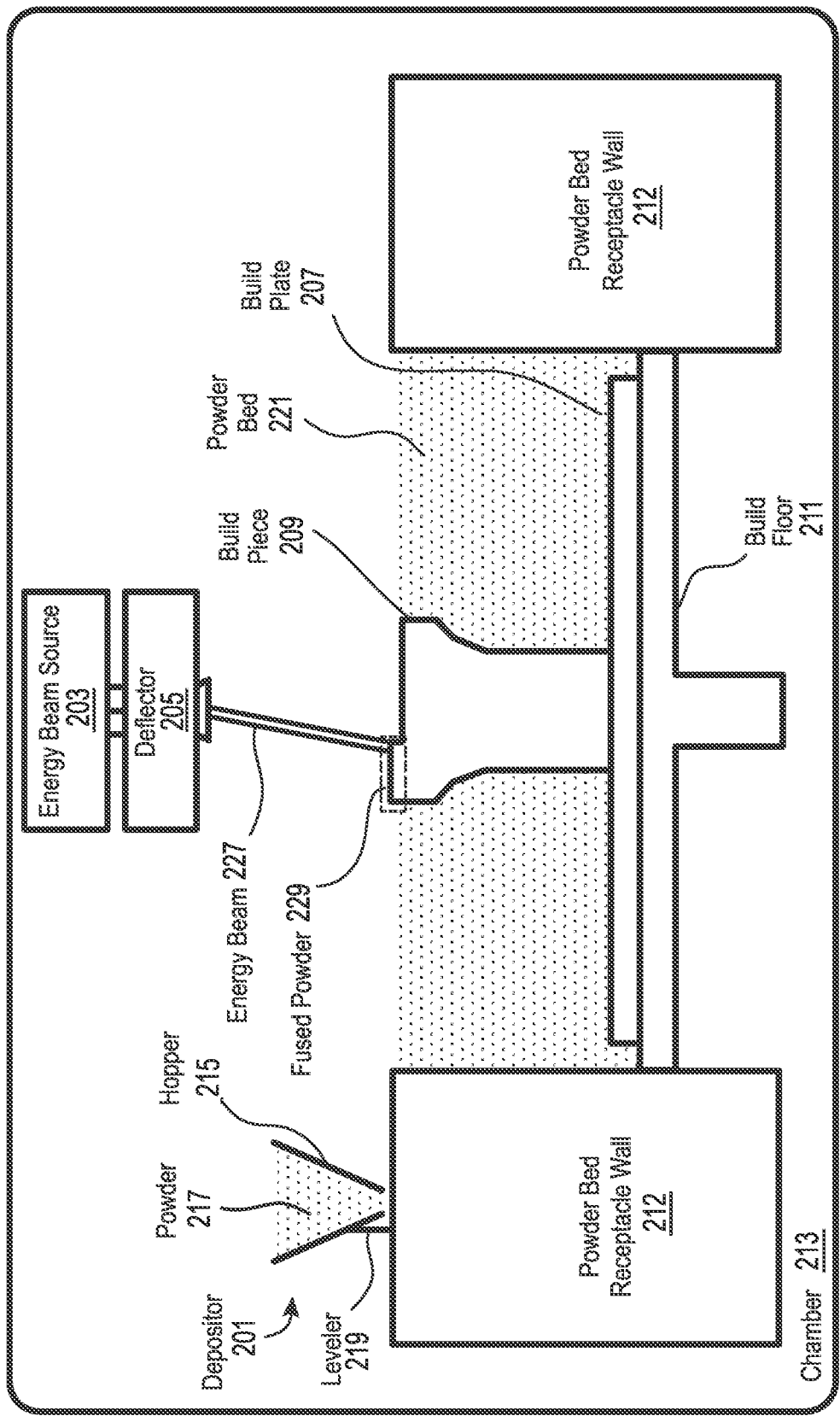

FIG. 2D shows PBF system 200 at a stage in which, following the deposition of powder layer 225 (FIG. 2C), energy beam source 203 generates an energy beam 227 and deflector 205 applies the energy beam to fuse the next slice in build piece 209. In various exemplary embodiments, energy beam source 203 can be an electron beam source, in which case energy beam 227 constitutes an electron beam. Deflector 205 can include deflection plates that can generate an electric field or a magnetic field that selectively deflects the electron beam to cause the electron beam to scan across areas designated to be fused. In various embodiments, energy beam source 203 can be a laser, in which case energy beam 227 is a laser beam. Deflector 205 can include an optical system that uses reflection and/or refraction to manipulate the laser beam to scan selected areas to be fused.

In various embodiments, the deflector 205 can include one or more gimbals and actuators that can rotate and/or translate the energy beam source to position the energy beam. In various embodiments, energy beam source 203 and/or deflector 205 can modulate the energy beam, e.g., turn the energy beam on and off as the deflector scans so that the energy beam is applied only in the appropriate areas of the powder layer. For example, in various embodiments, the energy beam can be modulated by a digital signal processor (DSP).

Components such as load-bearing panels often require complex interfaces and connections that are machined using conventional methods. These methods are often costly and time-consuming, if possible at all, given that traditional manufacturing techniques typically are not optimal for producing geometrically complex components. Moreover, because many conventional transport structures rely on body parts and outer shells that must be engineered to provide resistance to significant structural loads, sophisticated brackets, clamps, and other secure structures are often necessary to provide a sufficiently strong interface between these body panels and other components within the transport structure.

In more modern manufacturing techniques that use AM solutions in the production of transport structure such as automobiles, the body panels and outer shells of these automobiles are often no longer responsible for bearing the principal structural loads. As such, the practical requirements for increased strength and sophistication in the attachments and connections used with such panels and similar parts may no longer be applicable. As the demands for these mechanical attachments are relaxed, new solutions for providing interfaces between parts may become available.

Accordingly, in one aspect of the disclosure, an additively manufactured structure for providing an interface between parts in a transport structure is disclosed. The interface structure as proposed herein may, among other benefits, simplify interchangeability, eliminate the need for tooling and other conventional manufacturing techniques, and capitalize on the flexibility offered by AM technology. The interface structures as described herein can reduce or eliminate the need for brackets or other more complex interface structures. The interface structures as proposed herein may include functionality that can be integrated into existing parts where possible. Additionally, the interface structures can be modified and tailored to adapt to provide interfaces in new or custom situations where necessary.

The interface structures as disclosed herein may, in an embodiment, integrate porous bond faces at their surfaces for facilitating straightforward molding or co-molding with existing panels and other parts. The interface structures may, in another embodiment, incorporate co-printed adjustability. The interface structures may, in still another embodiment, enable the use of common "in-mold" attachment points for various open and mold processes that may be used for producing a part (e.g., a panel) that will be used in conjunction with the interface structure.

Figure 3:
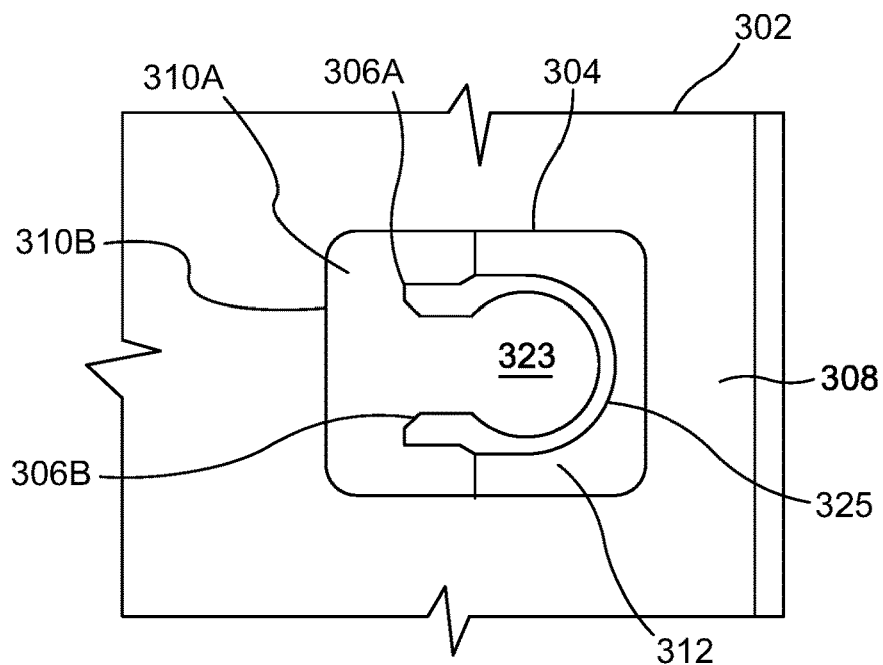
FIG. 3 is a front illustration of an interface structure affixed to a part.

FIG. 3 is a front illustration of an interface structure 304 affixed to a part 302. In an exemplary embodiment, the interface structure 304 may be additively manufactured. Further, in an exemplary embodiment, the part 302 may be a panel. The panel may be an exterior or outer panel of a transport structure, or it may be an interior panel. The part 302 may, alternatively, be another type of part for use within the transport structure. The interface structure 304 may be connected to part 302. In an embodiment, the interface structure 304 constitutes a body having opposing surfaces 310A and 310B (310B is obscured from view). The part 302 may have a surface 308 to which a corresponding surface 310B of the body of interface structure 304 may be affixed. For example, if the part 302 is a panel, an interior or Class-B side surface 308 of the panel may be affixed to a surface 310B (obscured from view) of the interface structure 304. If the part 302 is a part other than a panel, then to effect this surface-surface connection, the part 302 may have a flat or approximately flat surface having a surface area adequate to effect the surface-surface connection with interface structure 304. However, in other embodiments, the interface structure 304 may be curved or contoured to match a corresponding contour of the part 302. Thus, neither the interface structure 304 nor the part 302 need be flat in those embodiments. In still other embodiments, the body of the interface structure 302 may be coupled to the part 302 in ways other than a surface-to-surface connection.

Referring still to FIG. 3, the surface 310B of the interface structure 304 may be affixed to the surface 308 of the part 302 through various means. For example, an adhesive may be used to between surfaces 310B and 308 to secure the connection between interface structure 304 and part 302. Alternatively, a mechanical connection may be used in some embodiments, such as fixtures, clamps, screws, etc. In an embodiment, interface structure 304 and corresponding surface 310B are co-molded onto surface 308 of part 302.

Interface structure 304 may include on the surface 310A a fitting 312. The fitting 312 may extend from surface 310A of the interface structure 304. In an embodiment, the fitting 312 includes a pair of flex legs 306A and 306B and a partial circular shaped receptacle 323 for assembly (mating) with a complementary fitting on another part (not shown) to which the interface structure 304 provides an interface. A complementary fitting as used in this disclosure broadly includes any type of standard or non-standard hardware that enables a connection between two parts, including a male-female fitting, threaded fasteners with apertures, or any fitting wherein the respective structures on two components can be positioned and oriented to enable a connection. As used herein, the fitting of one component (e.g., fitting 312 of interface structure 104) is broadly deemed to mate with the complementary fitting of another component (e.g., a complementary fitting disposed on another panel) when the connection for which the fittings are designed is realized. In the exemplary embodiment shown, the pair of flex legs 306A and 306B may be used to fit into a complementary fitting, such as a pair of slots having the appropriate dimensions designed to receive flex legs 306A and 306B, wherein the slots are disposed on another part. Alternatively or additionally, fitting 312 may be configured to receive a circular member that can slide in between flex legs 306A and 306B in a direction orthogonal to a surface of fitting 312 and engage with the circular area 323 of the fitting 312. The circular nature 323 of the fitting 312 may enable the connection to provide a three way location, since a circular member inserted into circular area 323 may be able to rotate.

Figure 4:
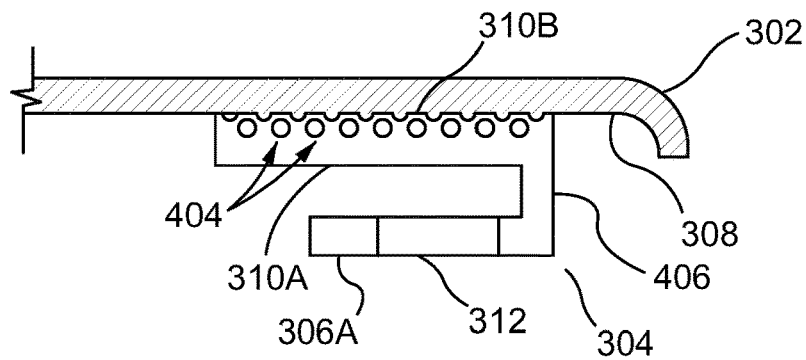
FIG. 4 is a top-down illustration of the interface structure of FIG. 3 affixed to the part.

FIG. 4 is a top-down illustration of the interface structure 304 affixed to the part 302. The fitting 312 includes an extension piece 406 extending from the surface 310A of interface structure 304. This extension piece 406 is simply a member that extends orthogonally to the interface structure 304 to separate the fitting 312 from the surface 310A and to provide room for the extension legs 306A and 306B to mate with an appropriate complementary fitting, e.g., to allow a circular member to slide into the area 323 as described above, or to enable flex legs 306A and 306B to engage with respective slots on another part.

As indicated above, the interface structure 304 may be affixed to the part 302 using different methods. In an embodiment, the interface structure 304 is co-molded onto the part 302. For example, where the part 302 is a panel and it is desirable to produce the panel 302 using a molding process, such as a composite panel, the interface structure 304 may be included in the molding process and co-molded to the composite panel contemporaneously with the panel being molded. This technique is described further below with reference to FIGS. 10-12. In an exemplary embodiment, prior to co-molding, the interface structure 304 is additively manufactured to include porous or matrix printed material 404 on the surface 310B. The addition of porous material 404 on surface 310B enables resin from prepreg plies to flow into the porous openings, thereby enabling a stronger connection between surface 310B and the composite part 302 (e.g., the panel) during the co-molding process.

Unlike conventional dedicated fittings or complex fittings designed to have a single use, the AM of the interface structure 304 means that the fittings of interface structure 304 may be varied widely. The use of different fittings may have different advantages, some of which are as simple as to provide a universal fitting that connects to the complementary fittings for a number of different parts.

Figure 5:
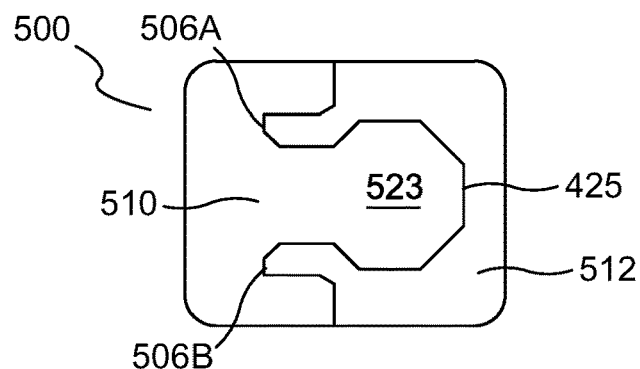
FIG. 5 is a front illustration of an interface structure.

FIG. 5 is a front illustration of an interface structure 500. The interface structure 500 is similar to the interface structure 304, except that in contrast to the fitting 304 of FIG. 3 which uses a partial circular shape 325, the fitting 512 of FIG. 5 uses a partial octagonal shape 425. Otherwise, the interface structure 500 includes a pair of flex legs 506A and 506B and a viewable surface 510. In embodiment, interface structure 500 may be suitable for a four (4) way location, whereas the interface structure 304 (FIG. 3) may be suitable for a three (3) way location. For example, a complementary fitting may include an elongated octagonal member engaging with octagonal area 523. The ridges from the octagonal shape may be used to prevent the member from rotating, eliminating the degree of freedom in the rotational direction.

It should be understood that the bodies of the various interface structures need not be limited to flat or curved body having a pair of opposing surfaces, but rather can equally well be composed of a variety of geometries. The interface structure can essentially include any shape suitable for providing the appropriate interface. By way of example, the interface structure may be composed of one or more protrusions or extensions, with one protrusion directly coupled to an appropriate fitting. The interface structure need not include an essentially flat rectangular body but instead can be composed of any suitable shape to enable it to interface between the parts. In some embodiments, a longer body may be desired where, for example, more space is desired between the two parts for which the interface is provided.

Figure 6:
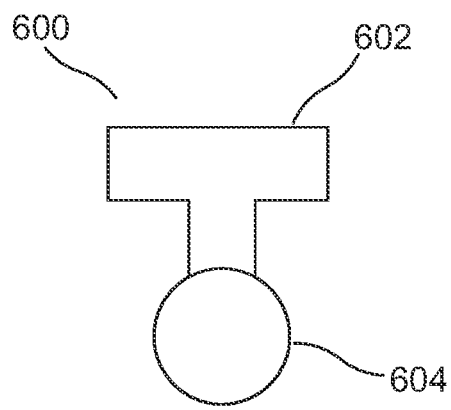
FIG. 6 is an illustration of a ball for receptacle fitting for use on the interface structure.

FIG. 6 is an illustration of a ball 604 for receptacle fitting 600 for use on the interface structure. Thus, in lieu of the structure 312 (FIG. 3) or 512 (FIG. 5), the fitting may include a ball 605 for insertion into a corresponding receptacle of a complementary fitting. As an example, in the case where the interface structure has a body including at least two surfaces or other structural sections (e.g., protrusions), the surface 602 of the fitting 600 may be arranged on a surface of the body or otherwise coupled to a structural section of the associated interface structure. Alternatively, the fitting to be attached on the body may not be the ball itself, but rather may be a receptacle that is configured to receive a ball disposed on a separate complementary fitting.

Figure 7:
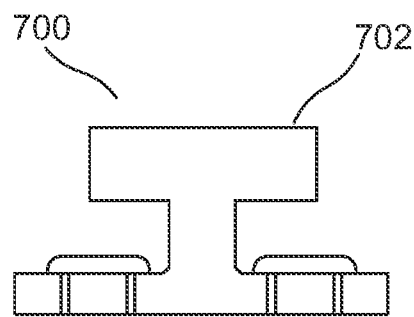
FIG. 7 is an illustration of a horizontal threaded mounting plate fitting for use on the interface structure.

FIG. 7 is an illustration of a horizontal threaded mounting plate fitting 700 for use on the interface structure. In this case, surface 702 may be arranged on the body of the interface structure. A complementary fitting disposed on another structure in this embodiment may include any structure that can be used in conjunction with a horizontal threaded mounting plate. For example, among numerous other applications, the horizontal threaded mounting plate fitting 700 may be used in combination with a threaded rod for supporting a particular fixture.

Figure 8:
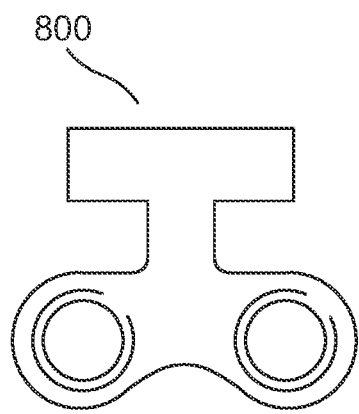
FIG. 8 is an illustration of a vertical threaded mounting plate fitting for use on the interface structure.

Numerous other fittings may be contemplated for use. FIG. 8 is an illustration of a vertical threaded mounting plate fitting 800 for use on the interface structure. This fitting 800 may be used for suspending structures from vertical surfaces, in addition to uses in other applications.

Figure 9:
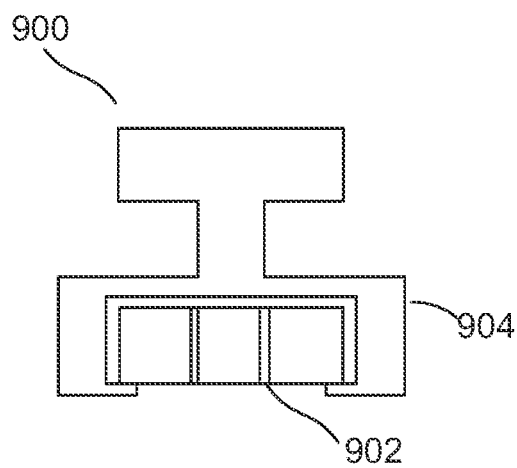
FIG. 9 is an illustration of a floating nut fitting for use on the interface structure.

FIG. 9 is an illustration of an AM floating nut fitting 900 for use on the interface structure. In an embodiment, the captive nut 902 of the floating nut fitting 900 may be contained within the component 906 and may float within the component 906. The captive nut 902 may be co-printed with component 906. By virtue of being 3-D printed, the interface structures can be arranged to have any number of possible fitting types and their complementary counterparts. The use of AM significantly increases the flexibility in producing the interface structures with virtually any degree of geometrical sophistication suitable for the application at issue.

Figure 10:
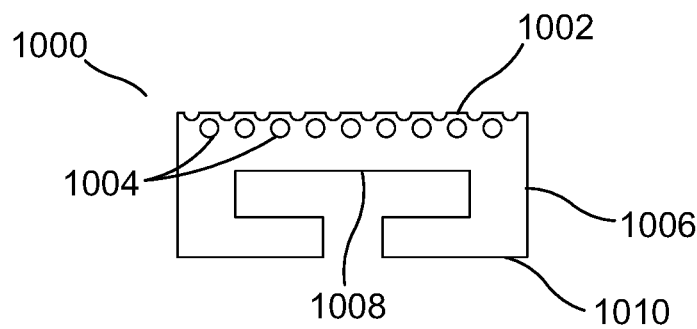
FIG. 10 is an illustration of a side view of an interface structure having a porous open cell matrix at a surface.

In an aspect of the disclosure, the AM interface structure may be co-molded with a part, such as a panel. The interface structure is first additively manufactured. FIG. 10 is an illustration of a side view of an AM interface structure 1000 having a porous open cell matrix 1004 at a surface. As before, the interface structure 1000 includes surface 1002 defined by open and porous matrix material 1004 which was incorporated during the AM process. The interface structure 1000 further includes opposing surfaces 1002 and 1008. An appropriate fitting 1010 is arranged on surface 1008 via an extension pieces 1006. The resulting interface structure may be used in subsequent co-molding steps as described in the exemplary embodiments that follow.

Figure 11:
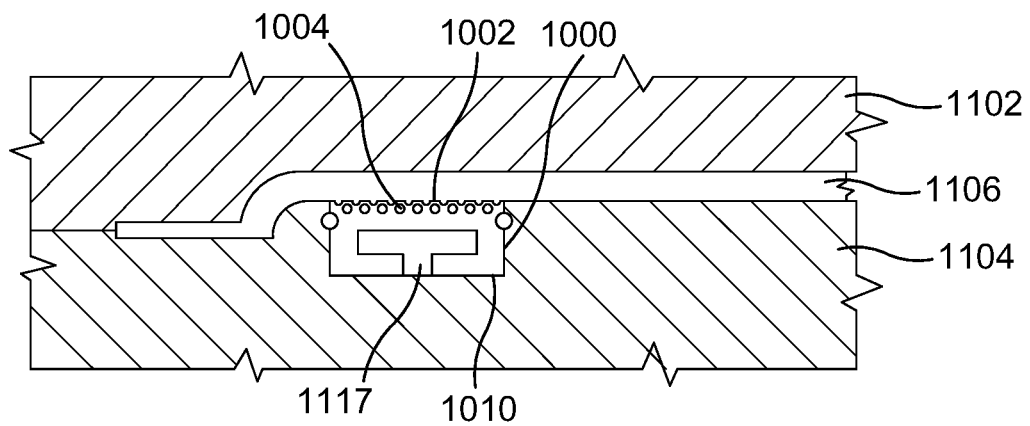
FIG. 11 is an illustration of a side view of a part being co-molded with an interface structure.

FIG. 11 is an illustration of a side view of a panel 1106 being co-molded with an interface structure. An AM interface structure 1000 is provided as discussed above. In addition, two tooling shells 1102 and 1104 are placed together for forming a panel 1106. Sandwiched between the tooling shells 1102 and 1104 is a material that will be molded and cured to produce the panel 1106. In an embodiment, the material is a composite material. For example, prior to closing the mold, the space between the mold may have been populated with prepreg plies of carbon fiber or another composite material, with additional steps performed as appropriate. In another embodiment, tooling shells 1102 and 1104 each constitute a platen and the panel is being formed in a platen press.

In an exemplary embodiment, the material used to produce the panel 1106 is carbon fiber reinforced polymer (CFRP). During layup, prepregs of a CFRP may be inserted into the mold. In addition to the composite material for the panel 1106, the tooling shell 1104 may be constructed to provide a space for insertion of the interface structure 1000 into the assembly. In an embodiment, tooling shell 1104 is additively manufactured to include a geometry to accommodate the interface structure 1000. In another embodiment, tooling shell 1104 and interface structure 1000 are co-printed. As noted previously, interface structure 1000 is 3-D printed with open and porous material 1004 to enable the interface structure 1000 to adhere more strongly to the panel 1106 to be formed.

After the tooling shells 1102 and 1104 are formed, the interface structure 1000 may be inserted into a cavity of tooling shell 1104 with the fitting portion 1010 of the interface structure disposed in a downward direction. The material for the panel 1106 is then added and the mold is closed. An aperture 1117 present in the interface structure 1000, or another reference point, may be used as a locating feature to ensure an accurate fit of the interface structure 1000 onto the panel 1106. Once the interface structure 1000 is positioned in the downward direction and properly located, the porous material can face the cavity where panel 1106 resides. Conventional molding techniques may be used at this point, including, for example and depending on the application, the use of adhesive and the drawing of a vacuum, and the application of heat. During this process, the interface structure 1000 may be permanently co-molded onto the panel 1106 at surface 1002. The panel, for example, may include the composite material (e.g., CFRP) in the form of prepreg plies in which the resin pre-incorporated into the CRFP flows into and occupies the spaces of the porous structure. When cured, a strong bond may form between interface structure 1000 and panel 1106 as a result of this process. The end result in this embodiment is that panel 1106 is formed to include the interface structure 1000 coupled to a surface of the panel at one end, and configured to interface with another component via fitting 1010 at the other end. As indicated above, the panel 1106 may be an exterior panel of a transport structure. Alternatively, the panel may be an interior panel, e.g., an interior door panel of a vehicle.

In other exemplary embodiments, the technique for co-molding the interface structure 1000 with the panel 1106 may be automated in whole or in part. For example, an automated constructor such as a robot, robotic arm, etc., may receive instructions from a processing system for performing relevant tasks such as placement of interface structure 1000 onto the panel 1106 using locating feature 1117. The 3-D printer itself may be part of a larger automated system in which the interface structure 1000 is 3-D printed, automatedly removed from the 3-D printer, transported as necessary using a mobile automated constructor or a vehicle, and placed into the mold. The automated molding process may in some embodiments be included as a part of the automated AM process, where the steps are performed sequentially. Alternatively, the molding may be performed automatedly under the control of a separate processing system.

In an embodiment, all of these tasks may be performed under the general control of a central controller, which may coordinate the construction of the co-molded panel as shown in FIG. 11, possibly along with simultaneous processes for manufacturing other parts. Alternatively, software control of the various procedures may be segmented, for example with control of the AM process relegated to the 3-D printer, control of the placement process (i.e., removing the part from the 3-D printer and placing the part on the mold) provided to another processing system, and the co-molding performed manually, or provided to yet another processing system, etc.

Figure 12:
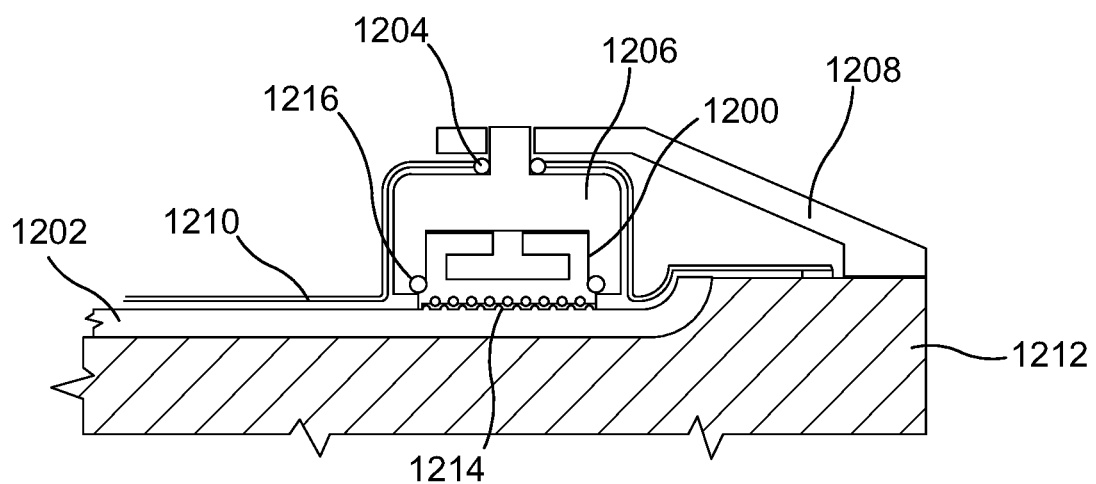
FIG. 12 is an illustration of a side view of a part being oven molded with an interface structure.

FIG. 12 is an illustration of a side view of a panel 1202 being oven molded with an interface structure. In the oven molding process, prepregs of carbon fiber plies may be inserted over the tooling shell 1212 during layup. The area over the tooling shell 1212 where the layup occurs is ultimately the area where the composite panel 1202 will be cured. In other embodiments, another type of composite material may be used. Thereupon, a vacuum bag 1210 may then be used to cover the assembly. The purpose of the vacuum bag 1210 is to evacuate air to thereby create mechanical pressure on the material during its cure cycle and to compact and conform the plies in the tooling shell 1212. It will be appreciated that the use of prepreg plies in both molding examples above is that they provide greater control over the fiber percentage in the final part. In addition, prepregs generally have a shorter cure time than other methods involving non-prepreg plies of composites. It should be understood, however, that other materials may be used during the layup process, and different composites are equally possible.

After the prepreg plies are draped over the tooling shell 1212, in some embodiments pressure is applied to the surface of the tooling shell 1212 over the plies to ensure a uniform fit of the plies in panel cavity 1202. In other embodiments, an autoclave may be used to achieve this purpose. Seals 1204 and 1216 are used to ensure that air does not escape during the process. Thereupon, the interface structure 1200 is placed over the composite material such that the porous material 1214 is facing the composite material. Locator 1208 may be used in conjunction with locator puck 1206 arranged over the interface structure 1200 in order to ensure that the interface structure 1200 is accurately placed over the surface of the composite material, thereby assuring that it will be in the proper place on the resulting panel 1202. The assembly is then placed in an oven mold, where a ramp up process occurs as the temperature is increased at some number of degrees Kelvin (or other unit) per minute. Once the target temperature is reached, a dwelling process may ensue where the temperature is maintained at a constant target level for a predetermined time period.

Figure 13:
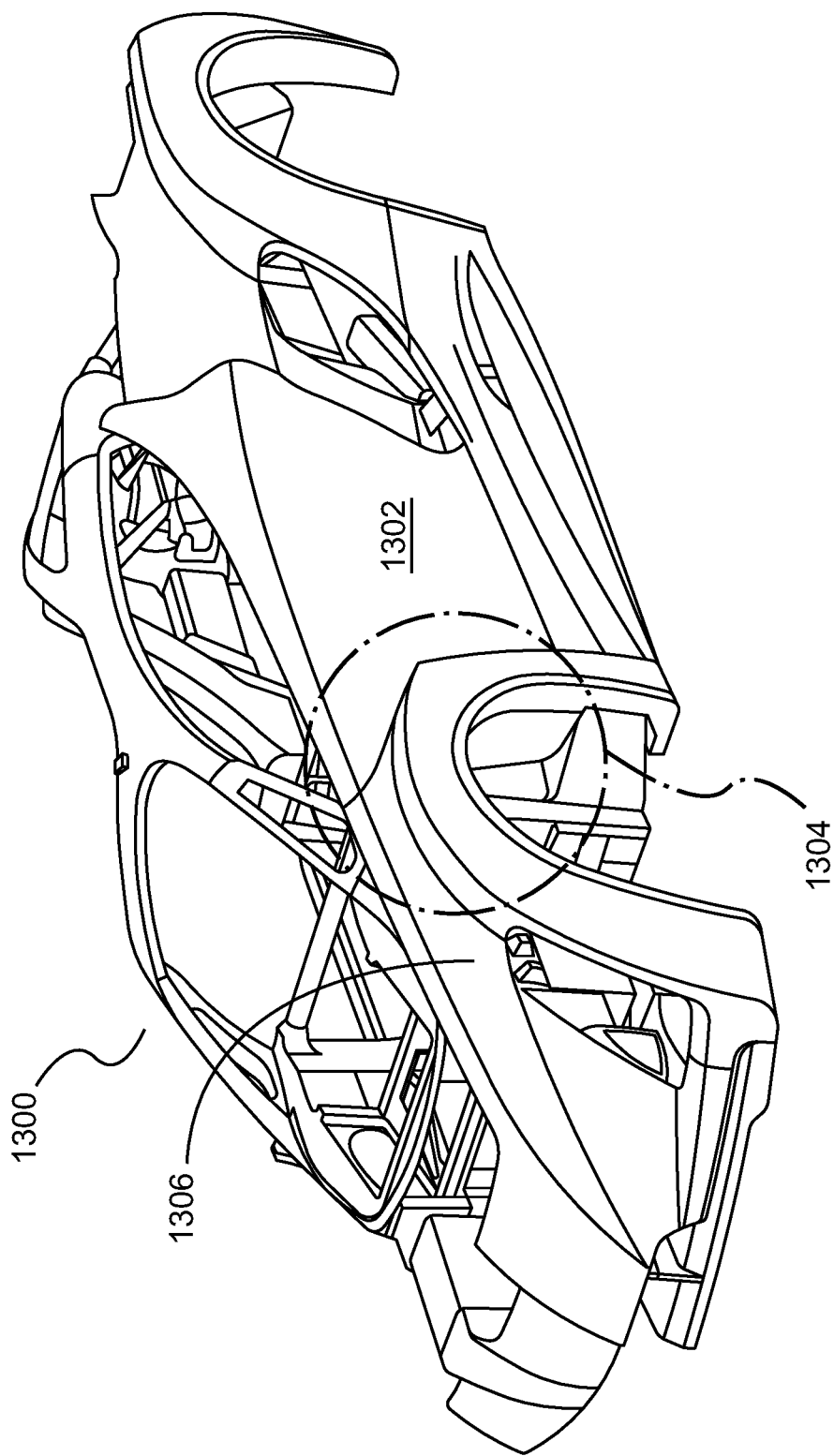
FIG. 13 is a perspective view of a Blade vehicle chassis having a partial set of body panels attached thereto.

Thereafter the temperature is decreased in a ramp down process. The curing process generally causes the polymers in the prepreg to cross link as the composite part solidifies. At this point, the AM interface structure in both processes as described in FIGS. 12 and 13 is connected to the panels or parts 1106 or 1202. Thereupon, the panel or part is now configured to be connected to another part via the fitting on the interface structure.

As described above, while in some embodiments the interface structure may have a flat, curved, or other shaped with opposing surfaces to enable connections on either side, the geometry of the interface structure is not so limited. In other embodiments, including in the examples below, the interface structure may include other sub-structures, sections, elongations and generally other geometries that are most readily adapted to the application at issue.

In another aspect of the disclosure, an interface structure as generally described above may be embodied in an additively manufactured node. A node is an AM structure that includes a feature, e.g., a socket, a receptacle, etc., for accepting another structure, e.g., a tube, a panel, etc. Nodes may be used, for example for forming vehicle chassis using connections to a plurality of connecting tubes. In an embodiment, a node includes a joint for providing one or more conventional structural connections to other components in the transport structure. By way of example, a joint may include protrusions for providing connections to a plurality of connecting tubes that may be used in combination with other joints to form a chassis. Joints are not so limited, however, in their application, and may generally be used to connect many different types of components together. Non-exhaustive examples may include the use of joints in connecting suspension systems to wheel systems, in connecting electronics to dash assemblies, and many other applications.

In an embodiment herein, an AM node incorporates a joint for providing one or more conventional structural connections. The node further includes an extended structure coupled to the joint for interfacing the joint with another part, such as a panel. FIG. 13 is a perspective view of a vehicle chassis, i.e., Blade supercar chassis 1300 built by Divergent Technologies, Inc., having a partial set of body panels and other various parts, e.g. panels 1302, attached thereto. Automobile chassis and corresponding panels, such as Blade supercar chassis 1300 and panel 1302, are examples of structures in which aspects of the disclosure can be practiced. In particular, a universal panel interface structure is demonstrated according to another aspect of the disclosure using an exemplary portion of the Blade supercar chassis 1300 and corresponding panels. Exemplary section 1304 of the vehicle includes an interface between front hood 1306 (shown only in part) and an "A-pillar" of the vehicle, and a portion of a windshield to be installed near the upper surface of circle 1304.

Figure 14:
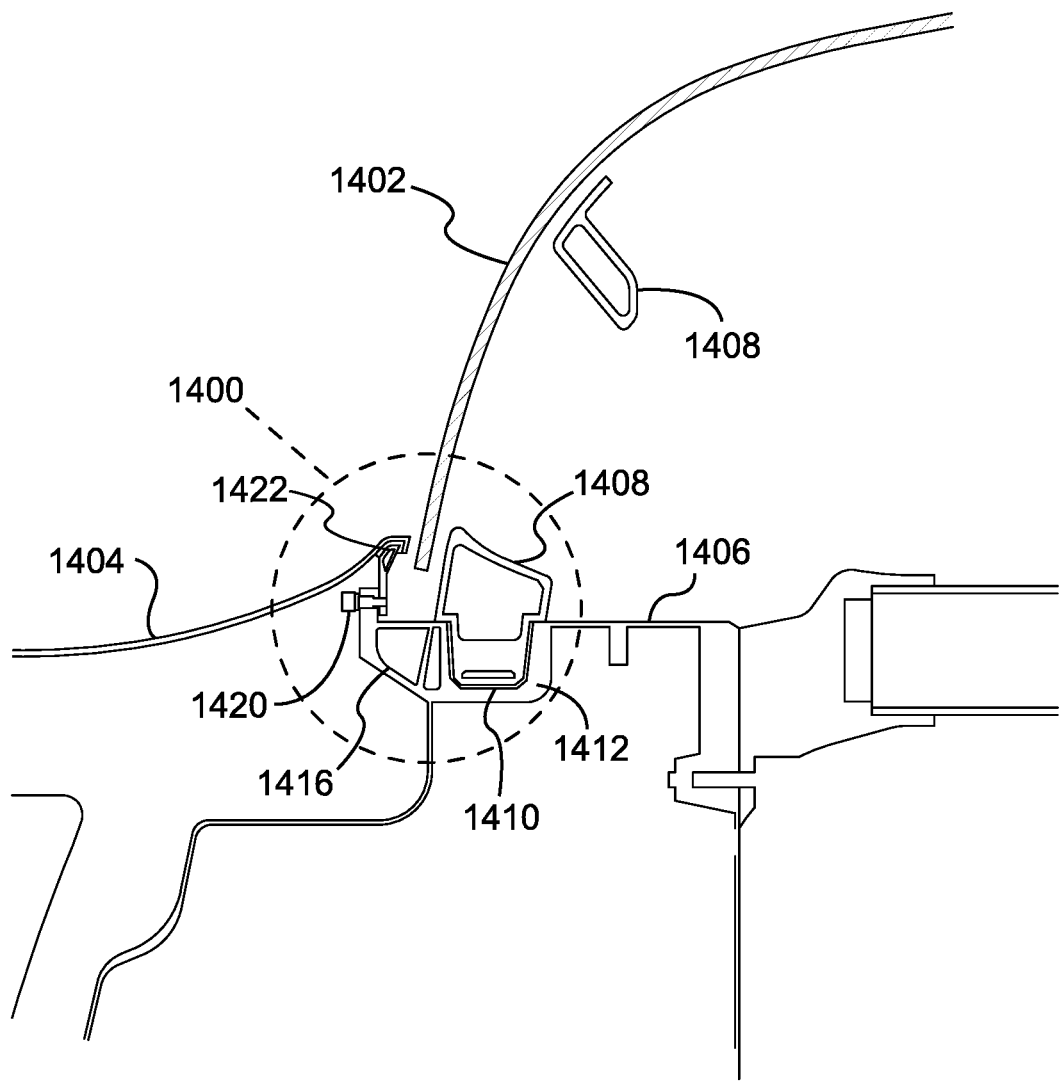
FIG. 14 is a side view of an additively manufactured node having a joint coupled to an extended structure for connecting the joint to a front hood via an extended structure.

FIG. 14 is a side view of an additively manufactured node 1400 having a joint 1412 coupled to an extended structure 1416. The joint 1412 is connected at structural region 1406 to other structures in the vehicle. The joint 1412 is further coupled to a lower portion of a windshield 1402 via an A-pillar. More specifically, joint 1412 includes a well or recessed area 1410 in which the base of one of A-pillars 1408 is situated and connected, mechanically via fixtures such as a clamp, mount, screws, protrusions, etc., via an adhesive, or through other connection means. In another embodiment, the A-pillar may be co-printed with the joint 1412. The joint 1412 may be used to provide a partial interface to windshield 1402 via A-pillar 1408—i.e., to provide an interface on the side of the windshield interior to the vehicle. For example, a portion of the right side of windshield 1402 near the joint 1400 may rest flush against A-pillar 1408.

The AM node 1400 may also include an extended structure 1416, which in this embodiment, is coupled to the joint 1412 via a network of metallic members. In some embodiments, the connection between the joint 1412 and extended structure 1416 is such that the two structures appear substantially as one, without any particular demarcation line. In an embodiment, the joint 1412 and extended structure are 3-D printed as a single structure. The extended structure 1416 is configured in this exemplary embodiment to provide an interface with vehicle hood 1404 via the fitting 1420 of the extended structure 1416 and the hood's complementary fitting 1422 (shown more clearly in FIG. 15). The hood 1404 can also be configured to interface with the lower portion of windshield 1402 using the extended structure 1416, the joint 1412, A-pillar 1408 and fitting 1420, along with other components. Accordingly, in one embodiment, node 1400, in addition to providing an interface between hood 1404 and joint 1412 via extended structure 1416 and fitting 1420, can also provide a number of additional interconnections to various other portions of the vehicle. According, AM node 1400 advantageously incorporates the aforedescribed interface structure as an extended structure coupled with a fully functional joint.

Figure 15:
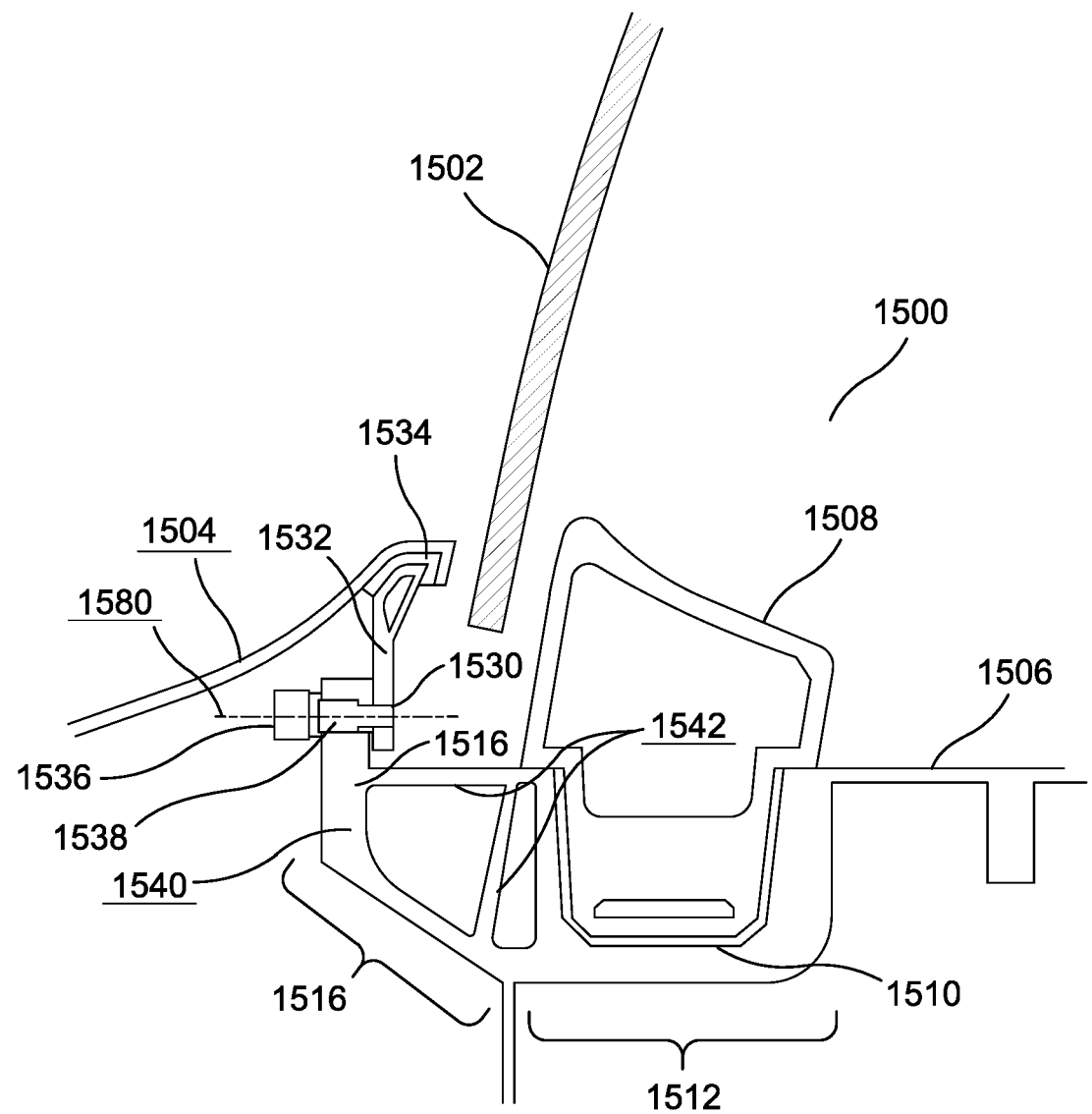
FIG. 15 is a side view of the additively manufactured node of FIG. 14.

FIG. 15 is an enlarged side view of the additively manufactured node 1500 including joint 1512 having extended structure 1516 for achieving the connections and interfaces described above with reference to FIG. 14. As shown in FIG. 15, extended structure 1516 in this exemplary embodiment is composed of a network of members, such as elongated member 1540 and members 1542. These structures may be chosen for design reasons, as other geometries may be equally suitable for other nodes. As before, joint 1512 of node 1500 may include a connection via recessed area 1510 to A-pillar 1508 for interfacing with windshield 1502, as well as another connection 1506 to other parts of the vehicle.

In the embodiment shown, elongated member 1540 of extended structure 1516 includes an upper area in which a fitting is situated for providing an interface, in this example, with hood 1504. In the example shown, member 1540 may include an aperture or protrusion generally disposed along the horizontal axis 1580 (or in other embodiments, a cut-out area along a surface of the member). A threaded fastener 1538 having a tightening knob 1536 may be provided through the protrusion through axis 1580. Fastener 1538 may extend through the protrusion and may be tightened by tightening knob 1536. At an area 1530 close to an end of the fastener 1538 that extends out of the protrusion, fastener 1538 may include a vertically disposed aperture for receiving a vertical rod or other member arranged on a surface 1534 adjacent hood 1504. In an exemplary embodiment, fastener 1538 and rod 1532 may constitute complementary fittings with respect to one another, with fastener 1538 being a fitting associated with extended structure 1516 and therefore node 1500, and with rod 1532 being associated with surface structure 1534 and hood 1505.

In an exemplary embodiment, surface structure 1534 may constitute an interface structure as described in previous embodiments, in which rod 1534 constitutes a fitting that extends from a first surface of structure 1534 and with the second, opposing surface of 1534 affixed to the hood 1504. In an embodiment, structure 1534 may be co-molded with the hood 1504 using techniques previously described. Structure 1534 in this respect may constitute a body of an interface structure for interfacing a panel (hood 1504) with a node (node 1500).

Figure 16:
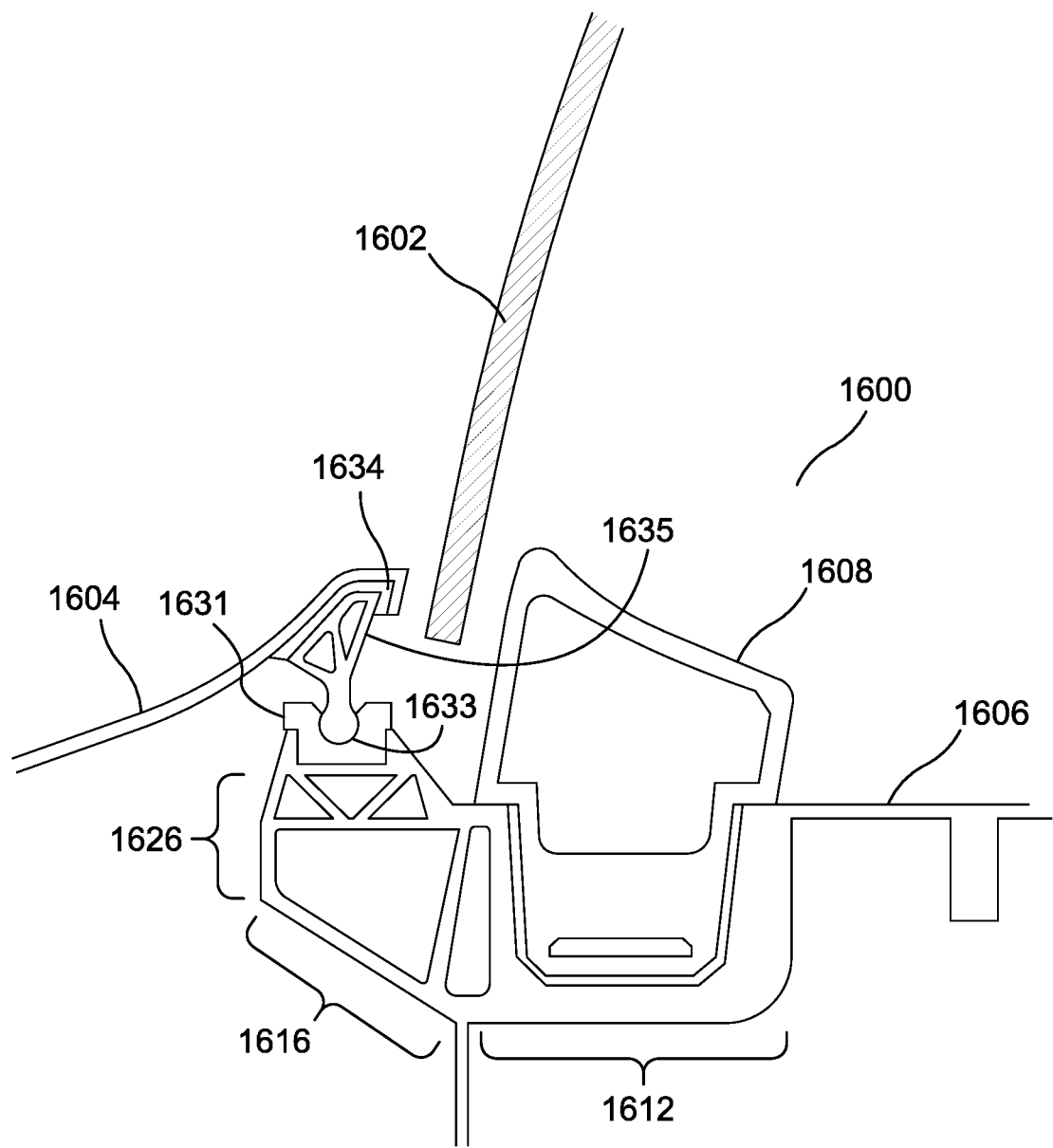
FIG. 16 is a side view of the additively manufactured node having an interface with an interface structure disposed on a vehicle hood.

FIG. 16 is a side view of the additively manufactured node 1600 connected with an interface structure 1634 disposed on a vehicle hood 1604. Similar to the previous illustrations, FIG. 16 shows node 1600 composed of joint 1612 for providing a connection 1606 to another structure (not shown), for providing a connection to windshield 1602 via A-pillar 1608 secured into the joint 1612, and for providing an extended structure 1616 having a network of members 1626 that connect at an end to a receptacle 1631 for a ball structure. Secured to a surface hood 1604 via a co-molding process or other affixation means (adhesive or mechanical connectors, etc.) is the corresponding surface of interface structure 1634. As in the previous illustrations, the body of interface structure 1634 is curved to match the contour of hood 1604. Extending from an opposing surface of interface structure 1634 (i.e., away from the hood 1604) is a small network of three converging members 1635 that terminate in a ball 1633 configured to fit into the receptacle 1631. Accordingly, body 1634 may be used to provide a simple and universal interface between the hood 1604 (or another part) and node 1600.

Figure 17:
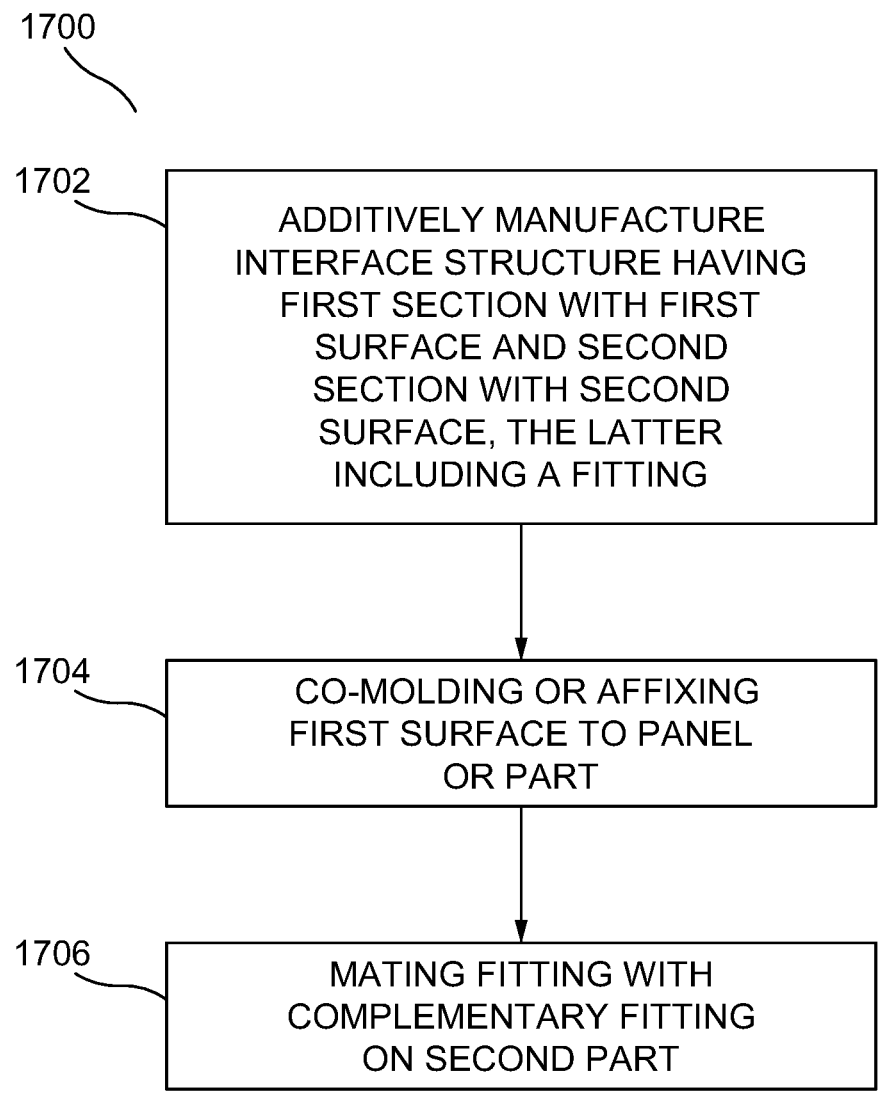
FIG. 17 is a flow diagram of an exemplary method for providing an interface between first and second parts of a transport structure.

FIG. 17 is a flow diagram of an exemplary method for providing an interface between first and second parts of a transport structure. In step 1702, an interface structure is additively manufactured. The interface structure has a first and second section and may further include first and second surfaces respectively associated with each section. The sections may include, for example, elongated members or chunks of materials, or rods that are narrow but that widen at the end to provide a wider surface area to accommodate a surface connection or a fitting. In some embodiments, the second section may extend directly into a fitting without the need for a predefined surface. For example, the second section may include an elongate rod having a ball at its end. As another illustration, the second section may include a threaded fastener.

In step 1704, the first surface is co-molded or otherwise affixed, through an adhesive or other means to a surface of the panel or other part to which will provide an interface. Here again, in some embodiments the first section may be geometrically oriented such that a flat first surface is not needed to effect the attachment to the part at issue.

In step 1706, the fitting is mated with a complementary fitting arranged on a second part. The interface structure is thereby able to provide the interface with the first and second parts.

The previous description is provided to enable any person skilled in the art to practice the various aspects described herein. Various modifications to these exemplary embodiments presented throughout this disclosure will be readily apparent to those skilled in the art, and the concepts disclosed herein may be applied to other techniques for providing interfaces between parts. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An apparatus for joining parts of a transport structure, comprising:
    an additively manufactured interface structure configured to be co-molded with a first part of the transport structure, wherein the interface structure includes,
    a uniform first surface configured to be connected to a uniform surface of the first part of the transport structure during the co-molding, and
    a second surface that comprises a female fitting configured to be mated with a complementary male fitting disposed on a second part of the transport structure that is configured to be received by the female fitting of the interface structure.

2. The apparatus of claim 1, wherein the uniform first surface is shaped to conform to the uniform surface of the first part.

3. The apparatus of claim 1, wherein the first part comprises a panel.

4. The apparatus of claim 1, wherein the second part comprises a node.

5. The apparatus of claim 1, wherein the uniform first surface is arranged substantially opposite the second surface.

6. The apparatus of claim 1, wherein the uniform first surface comprises a porous material.

7. The apparatus of claim 1, wherein the female fitting comprises a ball receptacle or a socket for a ball receptacle.

8. The apparatus of claim 1, wherein the female fitting comprises a mounting plate or a receptacle for a mounting plate.

9. The apparatus of claim 1, wherein the female fitting comprises a co-printed floating nut.

10. The apparatus of claim 1, wherein the female fitting comprises one or more flex legs.

11. The apparatus of claim 1, wherein the female fitting comprises one of a three-way location or a four-way location.

12. An additively manufactured node for a transport structure, comprising:
    a joint member configured to provide at least uniform one structural connection; and
    an extended structure coupled to the joint member and comprising a female fitting for connecting to a complementary fitting arranged on a part.

13. The node of claim 12, wherein the extended structure comprises at least one member coupled to the joint member.

14. The node of claim 13, wherein the member comprises a protrusion configured to support the fitting.

15. The node of claim 13, wherein the member comprises a recessed section configured to support the fitting.

16. The node of claim 12, wherein the female fitting comprises a threaded fastener.

17. The node of claim 16, wherein the threaded fastener comprises a protrusion for receiving a rod coupled to the part.

18. The node of claim 12, wherein the part comprises a panel.

19. The node of claim 18, wherein the panel comprises a vehicle hood.

20. The node of claim 12, wherein the female fitting comprises one of a ball receptacle or a socket for a ball receptacle.

21. The node of claim 12, wherein the female fitting comprises one of a mounting plate or a receptacle for a mounting plate.

22. The node of claim 12, wherein the female fitting comprises a co-printed floating nut.

* * * * *